(12) United States Patent
Tashiro et al.

(10) Patent No.: US 10,712,061 B2
(45) Date of Patent: Jul. 14, 2020

(54) AIR CONDITIONING APPARATUS

(71) Applicant: Mitsubishi Electric Corporation, Tokyo (JP)

(72) Inventors: Yusuke Tashiro, Tokyo (JP); Yasuhide Hayamaru, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 135 days.

(21) Appl. No.: 15/774,624

(22) PCT Filed: Dec. 2, 2015

(86) PCT No.: PCT/JP2015/083919
§ 371 (c)(1),
(2) Date: May 9, 2018

(87) PCT Pub. No.: WO2017/094148
PCT Pub. Date: Jun. 8, 2017

(65) Prior Publication Data
US 2018/0328635 A1 Nov. 15, 2018

(51) Int. Cl.
*F25B 41/04* (2006.01)
*F25B 47/02* (2006.01)
(Continued)

(52) U.S. Cl.
CPC ............ *F25B 41/046* (2013.01); *F25B 13/00* (2013.01); *F25B 41/04* (2013.01); *F25B 47/02* (2013.01);
(Continued)

(58) Field of Classification Search
CPC ............ F25B 41/062; F25B 2313/0251; F25B 2347/021; F25B 47/02; F25B 41/04; F25B 47/022; F25B 41/046
See application file for complete search history.

(56) References Cited

U.S. PATENT DOCUMENTS

2014/0116078 A1 5/2014 Doumyou et al.
2016/0370045 A1* 12/2016 Takenaka ................ F25B 47/02

FOREIGN PATENT DOCUMENTS

JP  S49-52343 A  5/1974
JP  S56-025654 A  3/1981
(Continued)

OTHER PUBLICATIONS

International Search Report of the International Searching Authority dated Feb. 16, 2016 for the corresponding International application No. PCT/JP2015/083919 (and English translation).
(Continued)

*Primary Examiner* — Michael R Reid
(74) *Attorney, Agent, or Firm* — Posz Law Group, PLC (57) ABSTRACT

An air conditioning apparatus includes a flow path switching valve. An outdoor heat exchanger is divided into a first heat exchanger and a second heat exchanger. During heating operation, a refrigerant is diverted and supplied to the first heat exchanger and the second heat exchanger. During the heating operation, the flow path switching valve combines the flows of the refrigerants discharged from the first heat exchanger and the second heat exchanger, and returns the resultant refrigerant to a refrigerant inlet of a compressor. Three ports of the flow path switching valve are internally communicated with one another while being isolated from an other single port during the heating operation. Two ports of the flow path switching valve are internally communicated with each other and other two ports are internally communicated with each other during defrosting operation of the first heat exchanger or the second heat exchanger.

3 Claims, 10 Drawing Sheets

(51) Int. Cl.
*F25B 13/00* (2006.01)
*F16K 11/074* (2006.01)

(52) U.S. Cl.
CPC .......... *F25B 47/022* (2013.01); *F16K 11/074* (2013.01); *F25B 2313/0251* (2013.01); *F25B 2347/021* (2013.01)

(56) References Cited

FOREIGN PATENT DOCUMENTS

| | | |
|---|---|---|
| WO | 2012/066895 A1 | 5/2012 |
| WO | 2013/001976 A1 | 1/2013 |
| WO | 2015/129080 A1 | 9/2015 |

OTHER PUBLICATIONS

Office Action dated Jun. 11, 2019 issued in corresponding JP patent application No. 2017-553557 (and English translation).
Office Action dated Jul. 1, 2019 issued in corresponding EP patent application No. 15909778.1.
Extended EP Search Report dated Aug. 28, 2018 issued in corresponding EP patent application No. 15909778.1.
Office Action dated Dec. 31, 2019 issued in corresponding CN patent application No. 201580085157.1 (and English translation).

\* cited by examiner

Prior Art

<HEATING MODE>

<HEATING/DEFROSTING MODE>

FIG.5

| OPERATION MODE | (1) HEATING | (2-1) HEATING/ DEFROSTING | (2-2) DEFROSTING/ HEATING | (3) COOLING |
|---|---|---|---|---|
| FLOW | A<br>B1—□—B2<br>C | A<br>B1—□—B2<br>C | A<br>B1—□—B2<br>C | A<br>B1—□—B2<br>C |
| REFRIGERANT STATE | B2→C  B1→C<br>(GAS, TWO-PHASE) | B2→C<br>(GAS, TWO-PHASE)<br>A→B1<br>(GAS) | B1→C<br>(GAS, TWO-PHASE)<br>A→B2<br>(GAS) | C→B2  C→B1<br>(GAS) |
| PRESSURE | A ···HIGH PRESSURE<br>B1,B2 ···LOW PRESSURE<br>C ···LOW PRESSURE | A,B1 ···INTERMEDIATE PRESSURE<br>B2,C ···LOW PRESSURE | A,B2 ···INTERMEDIATE PRESSURE<br>B1,C ···LOW | A ···HIGH<br>B1,B2 ···HIGH<br>C ···HIGH |

FIG.12
<HEATING MODE>

FIG.13

<HEATING/DEFROSTING MODE>

FIG.14
<COOLING MODE>

FIG.15

| OPERATION MODE | (1) HEATING | (2-1) HEATING/ DEFROSTING | (2-2) DEFROSTING/ HEATING | (3) COOLING |
|---|---|---|---|---|
| FLOW | | | | |

FIG.16

AIR CONDITIONING APPARATUS

CROSS REFERENCE TO RELATED APPLICATION

This application is a U.S. national stage application of International Application No. PCT/JP2015/083919, filed on Dec. 2, 2015, the contents of which are incorporated herein by reference.

TECHNICAL FIELD

The present invention relates to an air conditioning apparatus.

BACKGROUND

WO 2013/001976 (PTD 1) discloses an air conditioning apparatus capable of performing heating/defrosting operation, in which a refrigerant delivered from an indoor heat exchanger to an outdoor heat exchanger is evaporated, while an arbitrary heat exchange path is defrosted, by means of a defrosting flow path mechanism.

In the heating/defrosting operation, first, the refrigerant delivered from the indoor heat exchanger to the outdoor heat exchanger is caused, by the defrosting flow path mechanism, to pass through the arbitrary heat exchange path from a gas-side end to a liquid-side end of the arbitrary heat exchange path, without flowing into a refrigerant flow diverter. Then, the refrigerant that has passed through the arbitrary heat exchange path is caused, via the refrigerant flow diverter, to pass through another heat exchange path, other than the arbitrary heat exchange path, from a liquid-side end to a gas-side end of the another heat exchange path.

With such control of the flow of the refrigerant by providing the defrosting flow path mechanism and the refrigerant flow diverter, the outdoor heat exchanger can be defrosted with little deterioration in heating performance.

PATENT LITERATURE

PTD 1: WO 2013/001976

The air conditioning apparatus described in WO 2013/001976 is complicated in configuration due to the use of the refrigerant flow diverter and a plurality of electromagnetic valves and switching valves, with the outdoor heat exchanger divided into first to three heat exchange paths. This results in difficulty in reducing the size of the outdoor heat exchanger, and also adds to manufacturing costs.

SUMMARY

The present invention was made in view of such a problem, and has an object to provide an air conditioning apparatus capable of performing defrosting without stopping heating operation while having a simple configuration.

The present invention is directed to an air conditioning apparatus in which a refrigerant circulates through a compressor, an indoor heat exchanger, an expansion valve and an outdoor heat exchanger in this order during heating operation, the air conditioning apparatus including a switching valve provided in a flow path between the compressor and the outdoor heat exchanger.

The outdoor heat exchanger includes a first heat exchange unit and a second heat exchange unit having flow paths independent of each other. During the heating operation, the refrigerant from the expansion valve is divided and supplied to the first heat exchange unit and the second heat exchange unit.

The switching valve includes first to fourth connection ports. The first connection port is connected to a refrigerant outlet of the compressor. The second connection port is connected to the first heat exchange unit during the heating operation. The third connection port is connected to the second heat exchange unit during the heating operation. The fourth connection port is connected to a refrigerant inlet of the compressor during the heating operation. The switching valve is configured to change the communication relation among the first to fourth connection ports.

During the heating operation, the second connection port, the third connection port and the fourth connection port are communicated with one another and are not communicated with the first connection port.

During defrosting operation of the first heat exchange unit, the first connection port and the second connection port are communicated with each other, and the third connection port and the fourth connection port are communicated with each other.

During defrosting operation of the second heat exchange unit, the first connection port and the third connection port are communicated with each other, and the second connection port and the fourth connection port are communicated with each other.

According to the present invention, the outdoor heat exchanger is divided into the first heat exchange unit and the second heat exchange unit, which can be alternately defrosted by the single switching valve. Accordingly, an air conditioning apparatus capable of performing defrosting without stopping heating operation can be realized with a simple configuration.

DETAILED DESCRIPTION

Embodiments of the present invention will be described below in detail with reference to the drawings. While a plurality of embodiments are described below, it is initially intended to appropriately combine the features described in the respective embodiments. It should be noted that the same or corresponding parts are designated by the same symbols in the drawings and description thereof will not be repeated.

First Embodiment

The configuration of an air conditioning apparatus of a first embodiment is described in comparison with an examination case.

Figure 1:
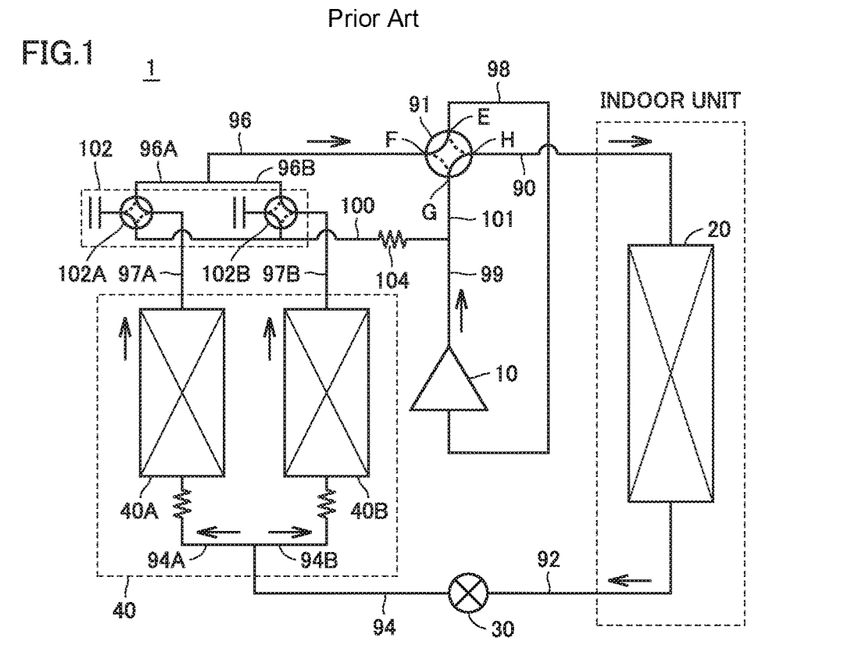
FIG. 1 is a configuration diagram of an air conditioning apparatus 1 of an examination case.
Figure 2:
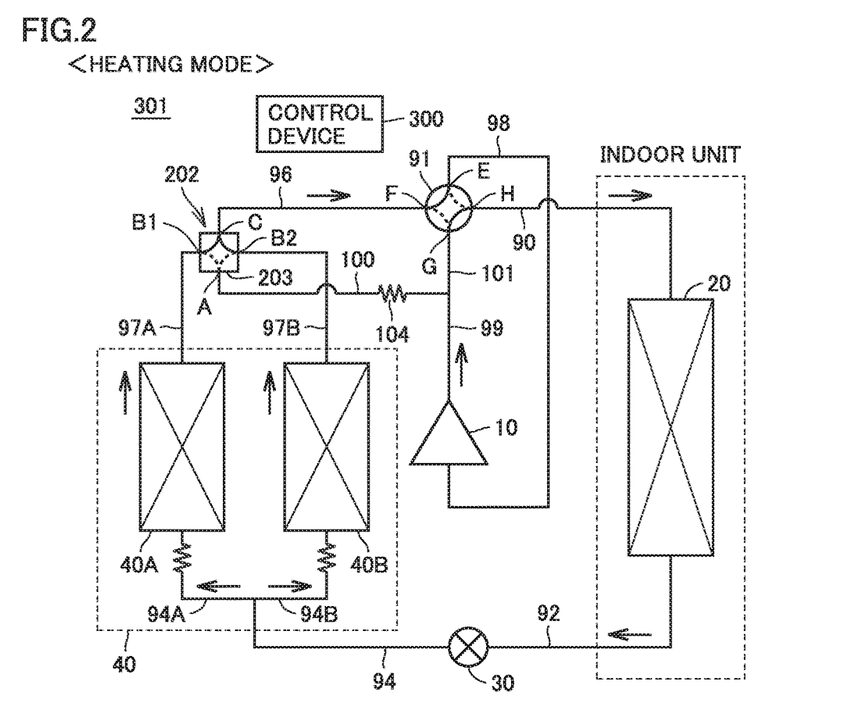
FIG. 2 is a configuration diagram of an air conditioning apparatus 301 according to a first embodiment.

FIG. 1 is a configuration diagram of an air conditioning apparatus 1 of an examination case. FIG. 2 is a configuration diagram of an air conditioning apparatus 301 according to a first embodiment. First, parts common to FIGS. 1 and 2 are described.

Referring to FIGS. 1 and 2, air conditioning apparatuses 1 and 301 each include a compressor 10, an indoor heat exchanger 20, an expansion valve 30, an outdoor heat exchanger 40, pipes 90, 92, 94, 96, 97A, 97B, 98, 99, 100 and 101, and a four-way valve 91. Outdoor heat exchanger 40 includes a first heat exchanger 40A and a second heat exchanger 40B. First heat exchanger 40A and second heat exchanger 40B are obtained, for example, by dividing outdoor heat exchanger 40 into upper and lower halves.

Pipe 90 connects a port H of four-way valve 91 to indoor heat exchanger 20. Pipe 92 connects indoor heat exchanger 20 to expansion valve 30. Pipe 94 branches along the way into a pipe 94A and a pipe 94B, and connects expansion valve 30 to first heat exchanger 40A and second heat exchanger 40B. Pipe 96 connects first heat exchanger 40A and second heat exchanger 40B of outdoor heat exchanger 40 to a port F of four-way valve 91 through a flow path switching unit 102 (FIG. 1) or a flow path switching valve 202 (FIG. 2). A refrigerant outlet and a refrigerant inlet of compressor 10 are connected to ports G and E of four-way valve 91, respectively. Pipes 97A and 97B connect first heat exchanger 40A and second heat exchanger 40B to flow path switching unit 102 (FIG. 1) or flow path switching valve 202 (FIG. 2), respectively. Pipe 99 is connected to the refrigerant outlet of compressor 10, and branches along the way into pipe 100 and pipe 101. Pipe 100 is provided with a flow restriction unit 104 at a portion thereof, and is connected to flow path switching unit 102 (four-way valves 102A and 102B in FIG. 1) or flow path switching valve 202 (a port A in FIG. 2). Pipe 101 connects pipe 99 to port G of four-way valve 91.

Expansion valve 30 is arranged in a portion of a refrigerant path formed of pipe 92 and pipe 94 connecting indoor heat exchanger 20 to outdoor heat exchanger 40.

Air conditioning apparatus 301 further includes a pressure sensor (not shown), a temperature sensor (not shown), and a control device 300.

Compressor 10 is configured such that its operating frequency varies in response to a control signal received from control device 300. By changing the operating frequency of compressor 10, the output of compressor 10 is adjusted. Various types of compressor 10 can be adopted, such as a rotary type, a reciprocating type, a scroll type, or a screw type.

During heating operation, four-way valve 91 connects the refrigerant outlet of compressor 10 to pipe 90 and connects the refrigerant inlet of compressor 10 to pipe 96, as indicated by solid lines. During cooling operation, four-way valve 91 connects the refrigerant outlet of compressor 10 to pipe 96 and connects the refrigerant inlet of compressor 10 to pipe 90, as indicated by dashed lines. The direction of the flow of a refrigerant during heating is indicated by arrows in FIGS. 1 and 2.

First, basic action of the heating operation is described. In the heating operation, the refrigerant flows in the direction indicated by the arrows. Compressor 10 draws in the refrigerant from pipe 96 through four-way valve 91, and compresses the refrigerant. The compressed refrigerant flows to pipe 90 through four-way valve 91.

Indoor heat exchanger 20 (condenser) condenses the refrigerant that has flown into pipe 90 from compressor 10 through four-way valve 91, and allows the resultant refrigerant to flow to pipe 92. Indoor heat exchanger 20 (condenser) is configured such that the high-temperature, high-pressure superheated vapor (refrigerant) discharged from compressor 10 exchanges heat with the indoor air (dissipates heat). The refrigerant is condensed and liquefied by this heat exchange. An indoor unit fan (not shown) is attached to indoor heat exchanger 20 (condenser), and control device 300 adjusts a rotational speed of the indoor unit fan by a control signal. By changing the rotational speed of the indoor unit fan, the amount of heat exchange between the refrigerant in indoor heat exchanger 20 (condenser) and the indoor air can be adjusted.

Expansion valve 30 reduces the pressure of the refrigerant that has flown from indoor heat exchanger 20 (condenser) to pipe 92. The pressure-reduced refrigerant flows to pipe 94. Expansion valve 30 is configured such that its opening can be adjusted by a control signal received from control device 300. Varying the opening of expansion valve 30 so as to reduce the opening reduces the refrigerant pressure at the outlet side of expansion valve 30, and increases the degree of dryness of the refrigerant. Varying the opening of expansion valve 30 so as to increase the opening, on the other hand, increases the refrigerant pressure at the outlet side of expansion valve 30, and reduces the degree of dryness of the refrigerant.

Outdoor heat exchanger 40 (evaporator) evaporates the refrigerant that has flown from expansion valve 30 to pipe 94. The evaporated refrigerant flows to pipe 96 through flow path switching unit 102 or flow path switching valve 202. Outdoor heat exchanger 40 (evaporator) is configured such that the refrigerant which has been reduced in pressure by expansion valve 30 exchanges heat with the outdoor air (absorbs heat). The refrigerant is evaporated and turned into superheated vapor by this heat exchange. An outdoor unit fan (not shown) is attached to outdoor heat exchanger 40 (evaporator). Control device 300 adjusts a rotational speed of the outdoor unit fan by a control signal. By changing the rotational speed of the outdoor unit fan, the amount of heat exchange between the refrigerant in outdoor heat exchanger 40 (evaporator) and the outdoor air can be adjusted.

During the heating operation performed in this manner, frost may form on outdoor heat exchanger 40 and need to be removed. In this case, options include temporary switching to the cooling operation to perform defrosting operation in which the high-temperature compressed refrigerant is allowed to flow to outdoor heat exchanger 40. However, the heating operation is thereby suspended and room comfort is compromised.

In the comparative example and the first embodiment, therefore, outdoor heat exchanger 40 is divided into first heat exchanger 40A and second heat exchanger 40B, which are alternately defrosted. Flow path switching unit 102 or flow path switching valve 202 is provided so as to allow the high-temperature, high-pressure refrigerant from compressor 10 to flow to the heat exchanger to be defrosted.

However, flow path switching unit 102 in the comparative example of FIG. 1 is complicated in configuration since it includes two four-way valves 102A and 102B. There is room for improvement in size reduction. Thus, flow path switching valve 202 is provided in the first embodiment of FIG. 2 instead of flow path switching unit 102. Flow path switching by switching valve 202 of air conditioning apparatus 301 in the first embodiment is now described.

Figure 3:
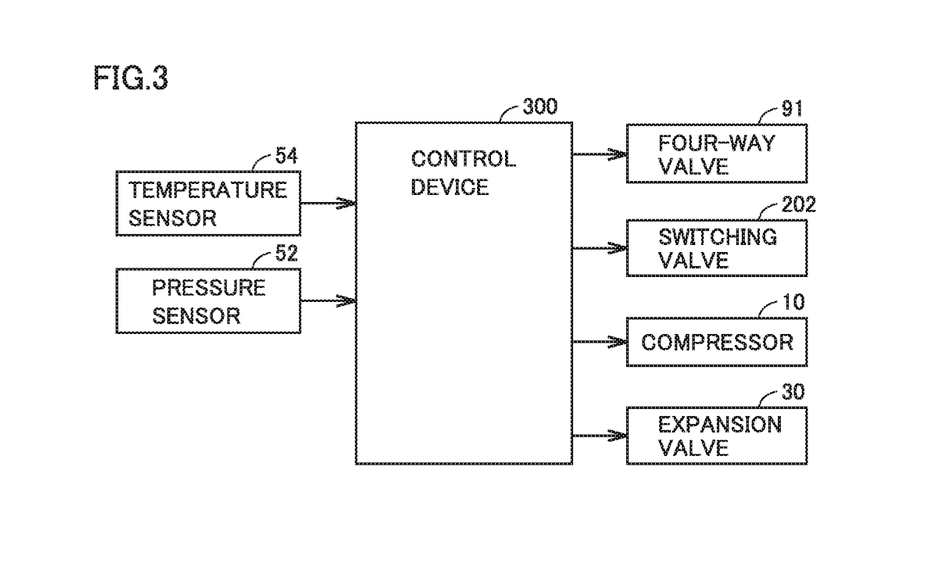
FIG. 3 is a block diagram illustrating a relation of connection of a control device in the air conditioning apparatus of the first embodiment.

FIG. 3 is a block diagram illustrating a relation of connection of the control device in the air conditioning apparatus of the first embodiment. Referring to FIG. 3, a pressure sensor 52 detects a pressure of the refrigerant at an outlet of outdoor heat exchanger 40 (evaporator), and outputs the detected value to control device 300. A temperature sensor 54 detects a temperature of the refrigerant at the outlet of outdoor heat exchanger 40 (evaporator), and outputs the detected value to control device 300.

Control device 300 includes a CPU (Central Processing Unit), a memory, an input/output buffer and the like (neither shown), and controls four-way valve 91, switching valve 202, compressor 10, expansion valve 30 and the like in air conditioning apparatus 1. It should be noted that this control is not limited to software processing, and can be processed by dedicated hardware (electronic circuit).

Figure 4:
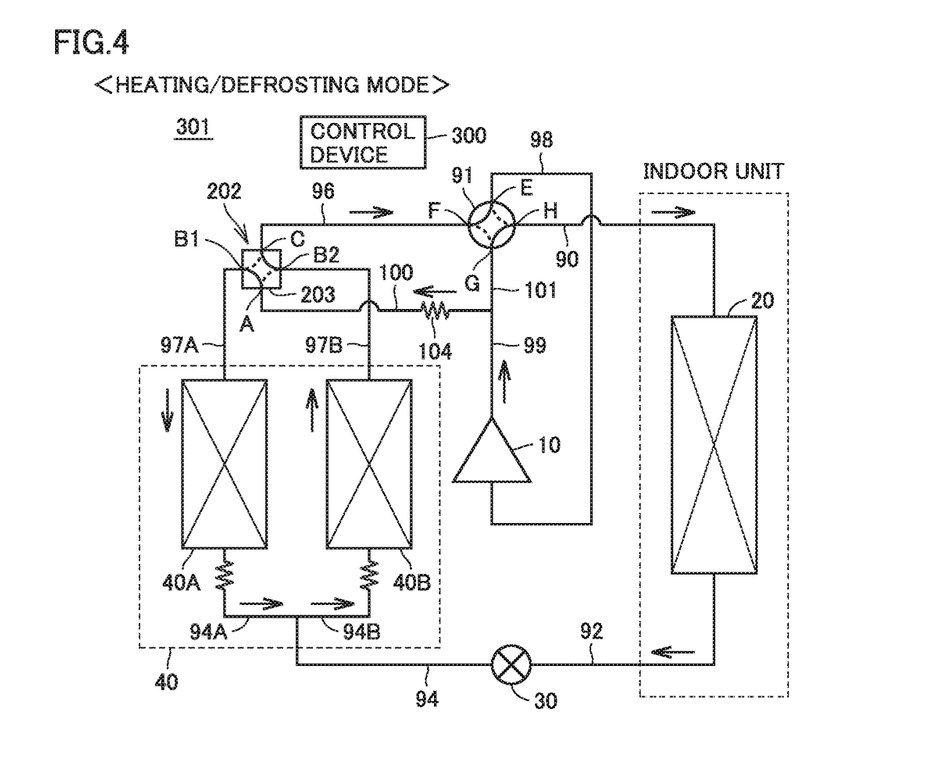
FIG. 4 is a diagram showing a state of a flow path switching valve 202 and a flow of a refrigerant in a defrosting mode during heating.

FIG. 4 is a diagram showing a state of flow path switching valve 202 and a flow of the refrigerant in a defrosting mode during heating. Referring to FIG. 4, during the defrosting of first heat exchanger 40A in the alternate defrosting, flow path switching valve 202 is set such that port A and a port B1 are communicated with each other, and a port B2 and a port C are communicated with each other. Thus, the high-temperature, high-pressure refrigerant discharged from compressor 10 partially flows through first heat exchanger 40A in a direction of an arrow. The frost on first heat exchanger 40A is thereby melted. During that time, the liquid refrigerant from expansion valve 30 continues to flow to second heat exchanger 40B, and second heat exchanger 40B acts as an evaporator, thereby maintaining the heating operation in indoor heat exchanger 20.

Figure 5:
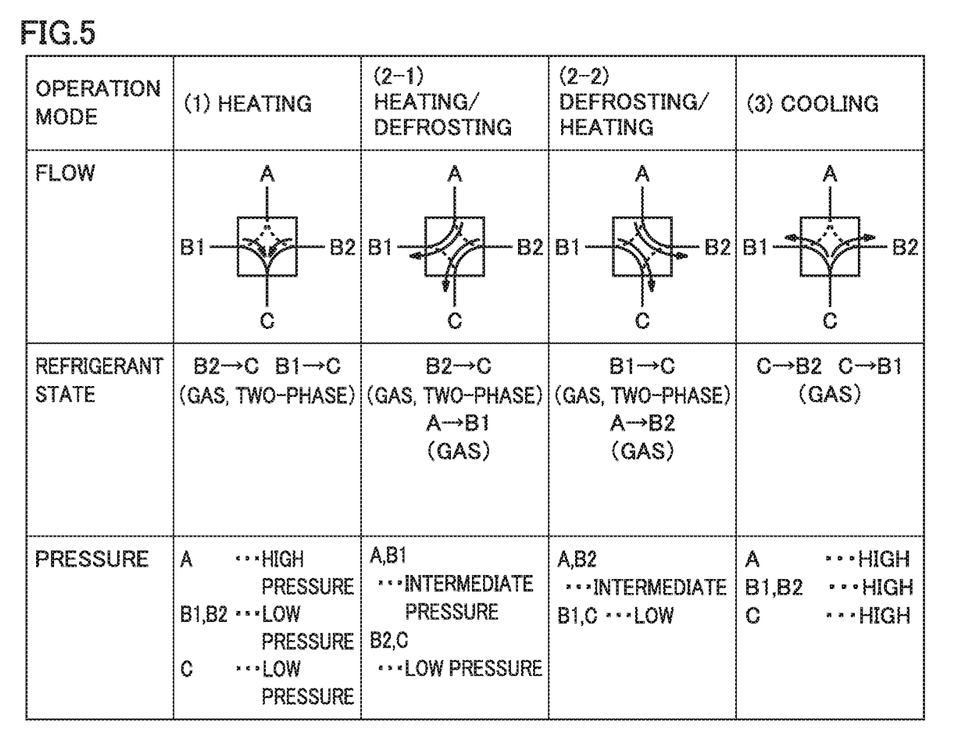
FIG. 5 is a diagram showing a flow of the refrigerant, a refrigerant state and pressure in each operation mode of flow path switching valve 202.

FIG. 5 is a diagram showing a flow of the refrigerant, a refrigerant state and pressure in each operation mode of flow path switching valve 202. Referring to FIG. 5, each operation mode is described. It should be noted that the defrosting of first heat exchanger 40A may be referred to as a "heating/defrosting operation mode," and the defrosting of second heat exchanger 40B may be referred to as a "defrosting/heating operation mode" in the following description for distinguishing purposes.

(1) In a heating operation mode, flow path switching valve 202 is in such a state that port B1, port B2 and port C are communicated with one another while port A is cut off. The refrigerant flows from ports B1 and B2 toward port C, and is in a gas-liquid two-phase state. The pressure at port A is high pressure, the pressures at ports B1 and B2 are low pressure, and the pressure at port C is also low pressure.

(2-1) In the heating/defrosting operation mode, flow path switching valve 202 is in such a state that port A and port B1 are communicated with each other, and port B2 and port C are communicated with each other. The refrigerant flows from port A toward port B1, and, independently of this flow, flows from port B2 toward port C. The refrigerant flowing from port B2 toward port C is in a gas-liquid two-phase state. The refrigerant flowing from port A toward port B1 is in a gaseous single-phase state. The pressures at ports A and B1 are intermediate pressure (where high pressure>intermediate pressure>low pressure), and the pressures at ports B2 and C are low pressure.

(2-2) In the defrosting/heating operation mode, flow path switching valve 202 is in such a state that port A and port B2 are communicated with each other, and port B1 and port C are communicated with each other. The refrigerant flows from port A toward port B2, and, independently of this flow, flows from port B1 toward port C. The flow of the refrigerant flowing from port B1 toward port C is in a gas-liquid two-phase state. The refrigerant flowing from port A toward port B2 is in a gaseous single-phase state. The pressures at ports A and B2 are intermediate pressure, and the pressures at ports B1 and C are low pressure.

(3) In a cooling operation mode, flow path switching valve 202 is in such a state that port B1, port B2 and port C are communicated with one another while port A is cut off. The refrigerant flows from port C toward ports B1 and B2, and is in a gaseous single-phase state. The pressure at port A is high pressure, the pressures at ports B1 and B2 are high pressure, and the pressure at port C is also high pressure.

With the description of the state of flow path switching valve 202 in each mode now finished, referring now to FIGS. 2 to 5 again, air conditioning apparatus 301 described in the first embodiment is summarized.

Air conditioning apparatus 301 includes compressor 10, indoor heat exchanger 20, flow restriction unit 104, outdoor heat exchanger 40, and flow path switching valve 202.

Indoor heat exchanger 20 is installed indoors, and receives a supply of the refrigerant from the refrigerant outlet of compressor 10 during the heating operation. Flow restriction unit 104 receives a supply of the refrigerant diverted from the refrigerant outlet of compressor 10 during the heating operation. Expansion valve 30 receives a supply of the refrigerant from a refrigerant outlet of the indoor heat exchanger during the heating operation. Outdoor heat exchanger 40 is installed outdoors, and is divided into first heat exchanger 40A and second heat exchanger 40B.

The refrigerant supplied from expansion valve 30 during the heating operation is diverted and supplied to first heat exchanger 40A and second heat exchanger 40B.

During the heating operation, flow path switching valve 202 combines the flows of the refrigerants discharged from first heat exchanger 40A and second heat exchanger 40B, and returns the resultant refrigerant to the refrigerant inlet of compressor 10.

Flow path switching valve 202 includes: port A that receives a supply of the refrigerant from compressor 10 through flow restriction unit 104; port B1 connected to a refrigerant outlet of first heat exchanger 40A through which the refrigerant is discharged during the heating operation; port B2 connected to a refrigerant outlet of second heat exchanger 40B through which the refrigerant is discharged during the heating operation; port C connected to the refrigerant inlet of compressor 10 during the heating operation; and a valve body 203 configured to change the internal communication relation among ports A, B1, B2 and C. It should be noted that port A corresponds to a "first connection port," port B1 corresponds to a "second connection port," port B2 corresponds to a "third connection port," and port C corresponds to a "fourth connection port."

Valve body 203 is configured such that port B1, port B2 and port C are internally communicated with one another while being isolated from port A during the heating operation (1: heating mode). Valve body 203 is configured such that port A and port B1 are internally communicated with each other and port B2 and port C are internally communicated with each other during the defrosting operation of first heat exchanger 40A (2-1: heating/defrosting mode). Valve body 203 is configured such that port A and port B2 are internally communicated with each other and port B1 and port C are internally communicated with each other during the defrosting operation of second heat exchanger 40B (2-2: defrosting/heating mode). Valve body 203 is configured to perform switching among the three states described above. It should be noted that valve body 203 is controlled during the cooling operation in a manner similar to that during the heating operation.

Figure 6:
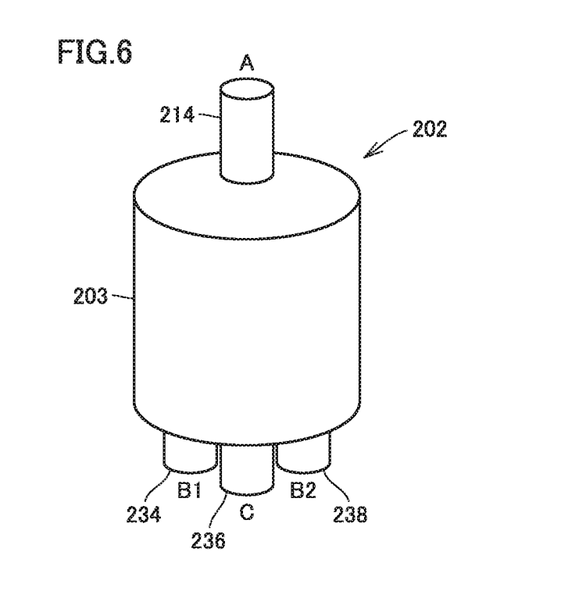
FIG. 6 is a diagram showing an external appearance of flow path switching valve 202.
Figure 7:
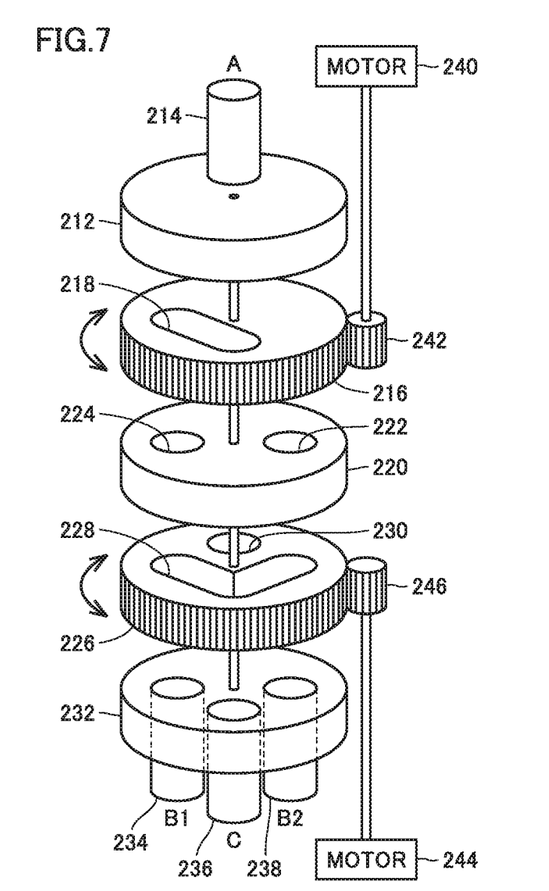
FIG. 7 is a schematic diagram illustrating an internal structure of flow path switching valve 202.
Figure 8:
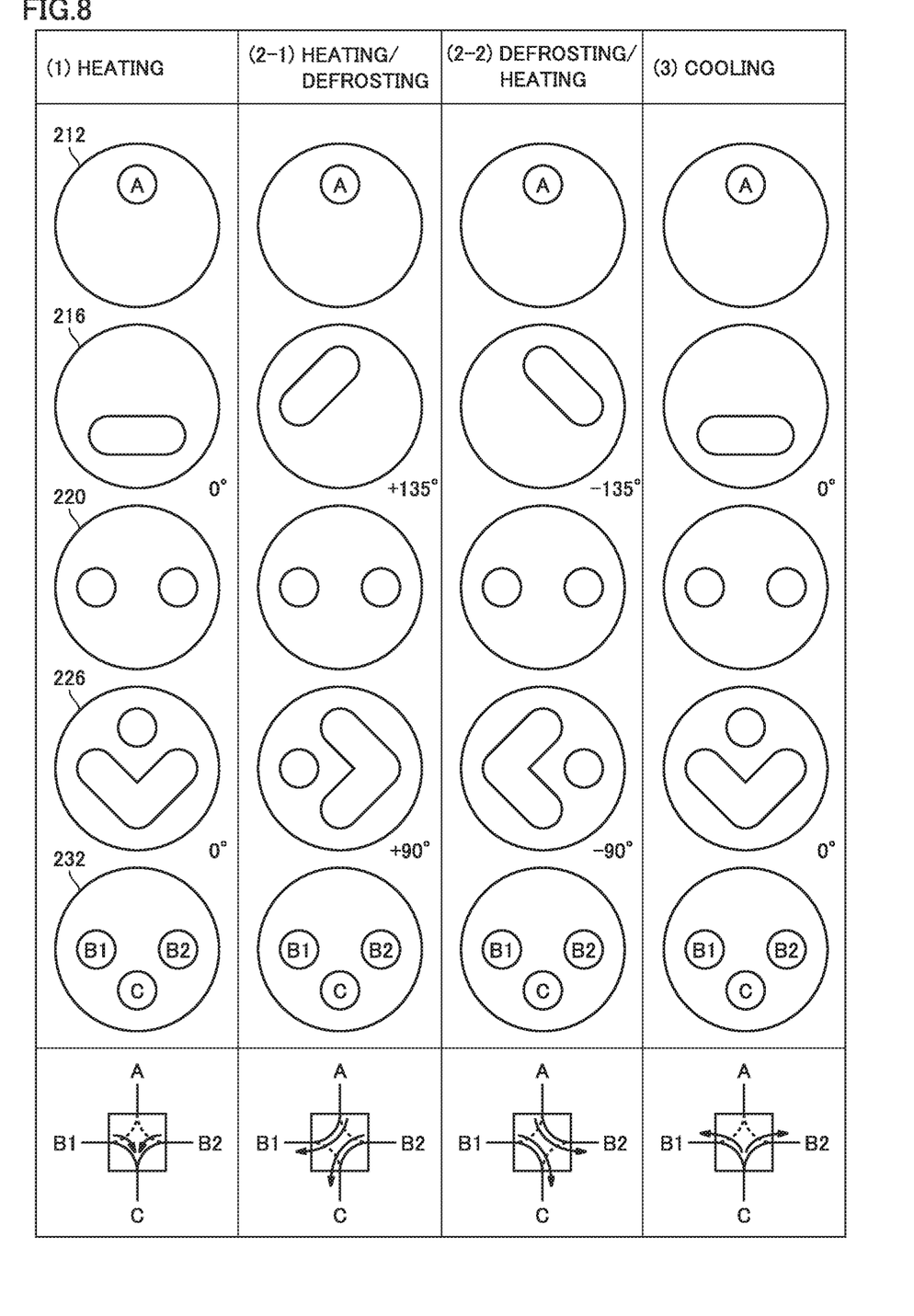
FIG. 8 is a diagram showing a controlled state of a rotary disk in each operation mode.

Next, a configuration example of flow path switching valve 202 is described. FIG. 6 is a diagram showing an external appearance of flow path switching valve 202. FIG. 7 is a schematic diagram illustrating an internal structure of flow path switching valve 202. FIG. 8 is a diagram showing a controlled state of a rotary disk in each operation mode.

Referring to FIG. 6, flow path switching valve 202 includes connection ports 214, 234, 238, 236 (ports A, B1, B2, C), and valve body 203. Connection port 214 receives a supply of the refrigerant from compressor 10 through the flow restriction unit. Connection port 234 is connected to the refrigerant outlet of first heat exchanger 40A through which the refrigerant is discharged during the heating operation. Connection port 238 is connected to the refrigerant outlet of second heat exchanger 40B through which the refrigerant is discharged during the heating operation. Connection port 236 is connected to the refrigerant inlet of compressor 10 during the heating operation. Valve body 203 is configured to change the internal communication relation among connection ports 214, 234, 238 and 236.

Referring to FIG. 7, flow path switching valve 202 includes: a lid portion 212 provided with connection port 214; a bottom 232 provided with connection ports 234, 236 and 238; a partition wall portion 220 provided with communicating holes 222 and 224; rotary disks 216 and 226; motors 240 and 244; and driving gears 242 and 246.

Rotary disk 216 is sandwiched between lid portion 212 and partition wall portion 220, and has an outer circumference mating with driving gear 242. Rotary disk 216 is provided with a communicating hole 218. Communicating hole 218 can connect connection port 214 to either one of communicating holes 222 and 224 (+135°, −135° in FIG. 8 described later). Connection port 214 can be closed by setting a rotation angle of rotary disk 216 such that communicating hole 218 and connection port 214 do not overlap each other (0° in FIG. 8 described later).

Control device 300 in FIG. 3 can change the rotation angle of rotary disk 216 by causing rotation of driving gear 242 using motor 240.

Rotary disk 226 is sandwiched between partition wall portion 220 and bottom 232, and has an outer circumference mating with driving gear 246. Rotary disk 226 is provided with communicating holes 228 and 230.

Rotary disk 226 allows connection ports 234, 236 and 238 to be communicated with one another by communicating hole 228 (0° in FIG. 8 described later). Rotary disk 226 can also connect connection ports 234 and 236, which are communicated with each other by communicating hole 228, to communicating hole 224, and can connect connection port 238 to communicating hole 222 by communicating hole 230 (−90° in FIG. 8 described later). Rotary disk 226 can also connect connection ports 236 and 238, which are communicated with each other by communicating hole 228, to communicating hole 222, and can connect connection port 234 to communicating hole 224 by communicating hole 230 (+90° in FIG. 8 described later).

Control device 300 in FIG. 3 can change the rotation angle of rotary disk 226 by causing rotation of driving gear 246 using motor 244.

It should be noted that while rotary disks 216, 226, and partition wall portion 220 are spaced from one another between lid portion 212 and bottom 232 for ease of understanding in FIG. 7, there is actually no space. In actuality, rotary disks 216, 226, and partition wall portion 220 are arranged in intimate contact with one another between lid portion 212 and bottom 232 so as to prevent leakage of the refrigerant, and are housed in a cylindrical case.

Referring to FIG. 8, the rotation angles of rotary disks 216 and 226 of flow path switching valve 202 in each mode are described.

(1) In the heating operation mode, the rotation angle of rotary disk 216 is set to a reference position (0°), and the rotation angle of rotary disk 226 is also set to a reference position (0°). As a result, in the heating operation mode, flow path switching valve 202 is in such a state that port B1, port B2 and port C are communicated with one another while port A is cut off. In the following description, the rotation angles will be indicated with the aforementioned reference position of each of rotary disks 216 and 226 being 0°.

(2-1) In the heating/defrosting operation mode, the rotation angle of rotary disk 216 is set to +135°, and the rotation angle of rotary disk 226 is set to +90°. As a result, in the heating/defrosting operation mode, flow path switching valve 202 is in such a state that port A and port B1 are communicated with each other, and port B2 and port C are communicated with each other. The refrigerant flows from port A toward port B1, and, independently of this flow, flows from port B2 toward port C.

(2-2) In the defrosting/heating operation mode, the rotation angle of rotary disk 216 is set to +135°, and the rotation angle of rotary disk 226 is set to −90°. As a result, in the defrosting/heating operation mode, flow path switching valve 202 is in such a state that port A and port B2 are communicated with each other, and port B1 and port C are communicated with each other. The refrigerant flows from port A toward port B2, and, independently of this flow, flows from port B1 toward port C.

(3) In the cooling operation mode, the rotation angle of rotary disk 216 is set to 0°, and the rotation angle of rotary disk 226 is also set to 0°. As a result, in the cooling operation mode, flow path switching valve 202 is in such a state that port B1, port B2 and port C are communicated with each other while port A is cut off. The refrigerant flows from port C toward ports B1 and B2.

Figure 9:
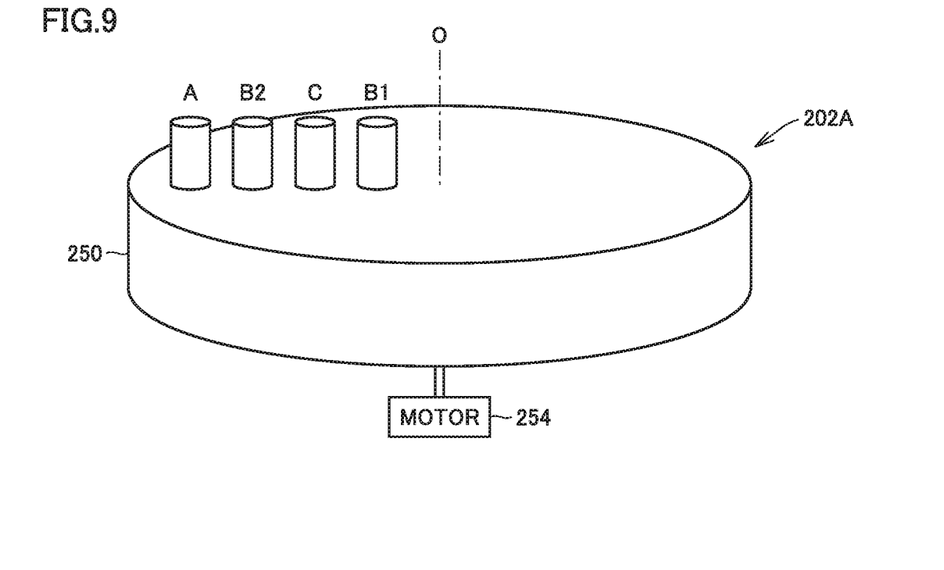
FIG. 9 is a diagram showing an external appearance of a flow path switching valve 202A, a second example of the flow path switching valve.
Figure 10:
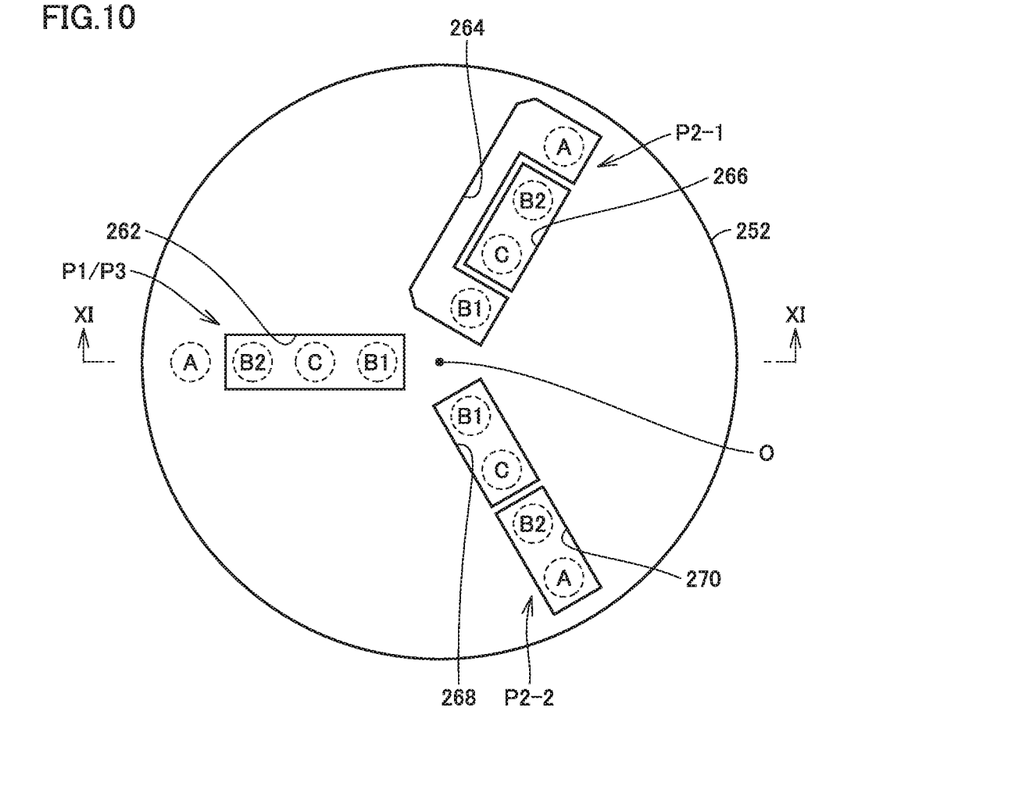
FIG. 10 is a diagram showing the shape of a rotary disk 252 included in flow path switching valve 202A.
Figure 11:
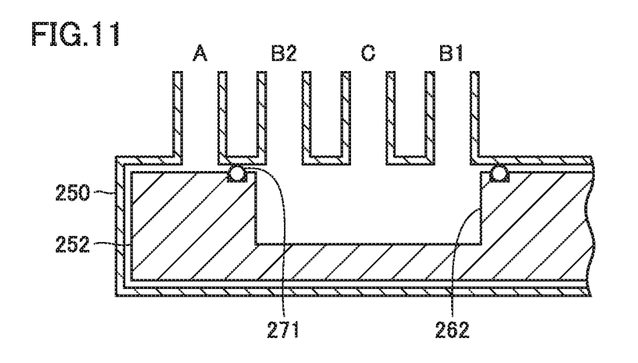
FIG. 11 is a sectional view along XI-XI in FIG. 10.

FIG. 9 is a diagram showing an external appearance of a flow path switching valve 202A, a second example of the flow path switching valve. FIG. 10 is a diagram showing the shape of a rotary disk 252 included in flow path switching valve 202A. FIG. 11 is a sectional view along XI-XI in FIG. 10.

Referring to FIGS. 9 to 11, flow path switching valve 202A includes a cylindrical valve body 250, and ports A, B1, B2 and C provided in an upper surface of valve body 250. The ports are provided such that they are linearly aligned in the order of ports A, B2, C and B1 from the outer circumference of the circular upper surface toward the center of the circle. Valve body 250 houses rotary disk 252 therein. Rotary disk 252 can be rotated by a motor 254.

Rotary disk 252 is provided with recesses 262, 264, 266, 268 and 270 in its upper surface. The sectional view of FIG. 11 shows a cross-sectional shape of recess 262 as an example.

Recess 262 is provided at a rotational position P1 selected in the heating mode and a rotational position P3 selected in the cooling mode, and forms, together with a case of valve body 250, a flow path through which ports B1, B2 and C are communicated with one another. A sealing member 271 such as an O ring is arranged around recess 262 to attain sealing so as to prevent leakage of the refrigerant between the case of valve body 250 and rotary disk 252. Port A is closed in this state.

Recess 264 is provided at a rotational position P2-1 selected in the heating/defrosting mode (2-1), and forms, together with the case of valve body 250, a flow path through which ports A and B1 are communicated with each other. Recess 266 is provided at rotational position P2-1 selected in the heating/defrosting mode (2-1), and forms, together with the case of valve body 250, a flow path through which ports B2 and C are communicated with each other.

Recess 268 is provided at a rotational position P2-2 selected in the defrosting/heating mode (2-2), and forms, together with the case of valve body 250, a flow path through which ports B1 and C are communicated with each other. Recess 270 is provided at rotational position P2-2 selected in the defrosting/heating mode (2-2), and forms, together with the case of valve body 250, a flow path through which ports B2 and A are communicated with each other.

With flow path switching valve 202A in the variation shown in FIGS. 9 to 11, the number of switching valves can be reduced in a manner similar to flow path switching valve 202, and furthermore, the control can be simplified since there is only one motor 254 that needs to be controlled.

While the rotational positions are equally provided at approximately every 120° in FIG. 10, it is not particularly required for the rotational positions to be equally provided. The rotational positions may be changed as appropriate as long as they are spaced such that the recesses of the flow paths do not overlap one another. (For example, a rotary disk in FIG. 16 to be described later, with a recess 454 removed therefrom, may also be used.) In addition, while the configuration was shown having four connection ports aligned in a row, it is not required for the connection ports to be aligned in a row. For example, the connection ports may be arranged in two rows and two columns, with the recesses altered in shape in accordance with the arrangement of the connection ports. In this case, the diameter of the rotary disk can be reduced.

While FIGS. 9 and 10 show an example in which the recesses of the flow paths are provided in the rotary disk, the valve body may be formed into a vertically long cylindrical shape, for example, with four connection ports linearly aligned on the side of a cylindrical case. In this case, a cylindrical member provided with three patterns of recesses of flow paths on its side may be housed in the cylindrical case. Similar flow path switching can be performed by rotating the cylindrical member around a rotation axis passing through the center of a circle of each of upper and lower bottom surfaces.

As described above, the air conditioner of the first embodiment can perform defrosting without stopping the heating while having a simple configuration. Accordingly, the size of the air conditioner can be advantageously reduced, and the number of components can be reduced to cut the manufacturing costs.

Second Embodiment

A second embodiment is identical to the first embodiment in that the outdoor heat exchanger is divided and alternately defrosted. The second embodiment is different from the first embodiment in the configuration of the flow path switching valve and the relation of connection to the four-way valve, thereby further reducing heat loss at the four-way valve than in the first embodiment, in addition to allowing the defrosting without stopping the heating operation while having a simple configuration.

Figure 12:
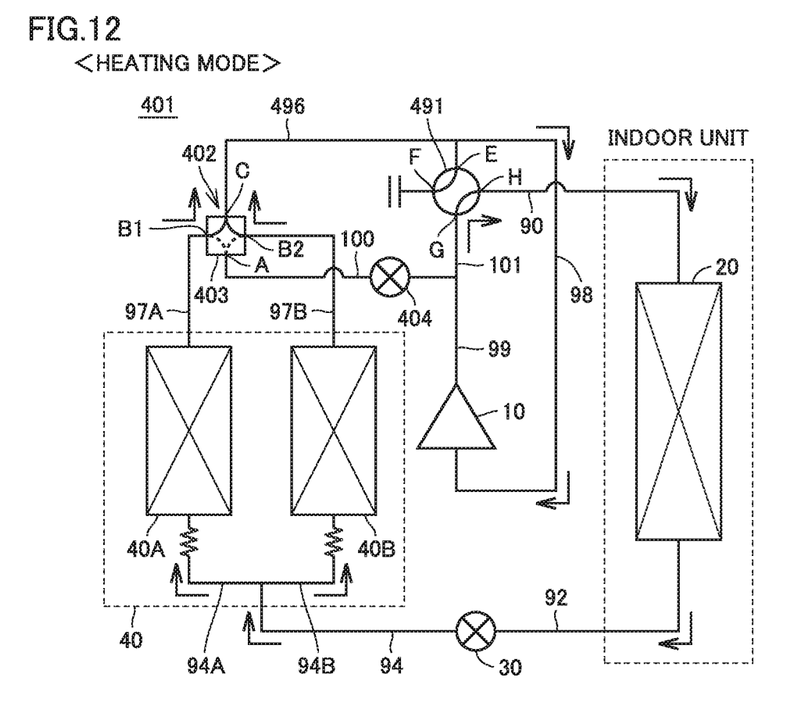
FIG. 12 is a configuration diagram of an air conditioning apparatus 401 according to a second embodiment.

FIG. 12 is a configuration diagram of an air conditioning apparatus 401 according to the second embodiment. Air conditioning apparatus 401 shown in FIG. 12 includes, in the configuration of air conditioning apparatus 301 shown in FIG. 2, a flow path switching valve 402 instead of flow path switching valve 202, a four-way valve 491 instead of four-way valve 91, and a flow regulating valve 404 instead of flow restriction unit 104. The configuration of air conditioning apparatus 401 is otherwise the same as the configuration of air conditioning apparatus 301 already described in the first embodiment, and thus the description thereof will not be repeated.

Port C of flow path switching valve 402 is connected to a pipe 496. Pipe 496 is directly connected to pipe 98 without passing through four-way valve 491. A first port E of four-way valve 491 is connected to the connection between pipe 496 and pipe 98. A second port F of four-way valve 491 is closed. A third port G of four-way valve 491 is connected to the refrigerant outlet of compressor 10. A fourth port H of four-way valve 491 is connected to indoor heat exchanger 20.

In the heating mode, four-way valve 491 is controlled to connect the refrigerant outlet of compressor 10 to indoor heat exchanger 20. Flow regulating valve 404 is closed in the heating mode.

In the heating mode, four-way valve 491 is controlled such that port E is communicated with closed port F, and port G is communicated with port H. Flow regulating valve 404 is configured to be closed in the heating mode, to be opened in the cooling mode, and such that its opening is reduced during the defrosting of first heat exchanger 40A or second heat exchanger 40B. An internal state of a valve body 403 will be described later in FIG. 15.

While the refrigerant basically flows similarly to the flow indicated by the arrows in FIG. 2, the low-pressure, low-temperature refrigerant does not flow to four-way valve 491 in FIG. 12 due to the direct connection between pipe 496 and pipe 98. Thus, heat exchange between the high-temperature refrigerant and the low-temperature refrigerant at the four-way valve is less likely to occur, so that the heat loss is further reduced than in the configuration shown in FIG. 2. Accordingly, the air conditioning apparatus consumes less power than in the configuration of FIG. 2.

Figure 13:
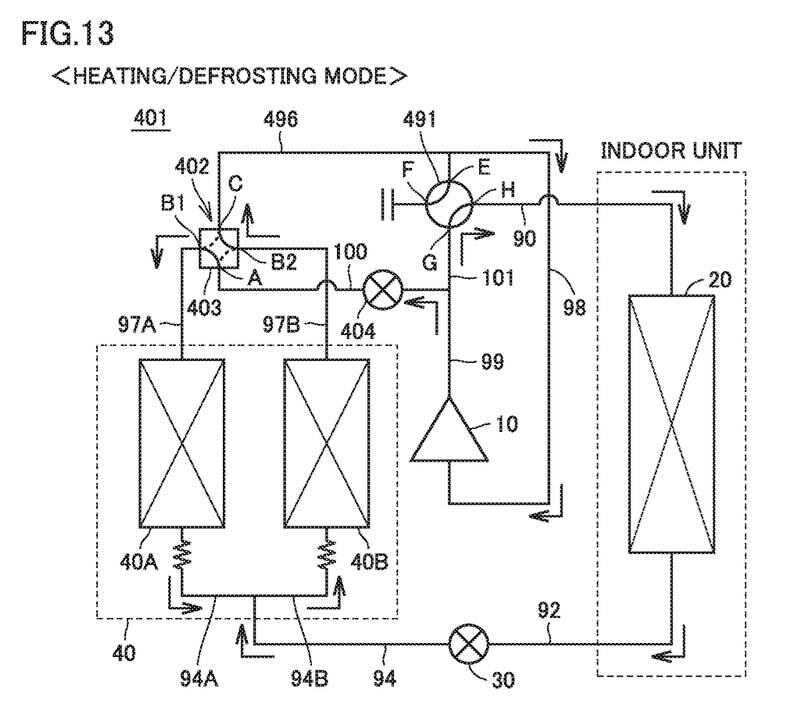
FIG. 13 is a diagram showing a state of a flow path switching valve 402 and a flow of the refrigerant in a defrosting mode during heating.

FIG. 13 is a diagram showing a state of flow path switching valve 402 and a flow of the refrigerant in the defrosting mode during heating. In the defrosting mode during heating, four-way valve 491 is set to the same state as in the heating mode of FIG. 12. In the defrosting mode during heating, the opening of flow regulating valve 404 is reduced. Thus, the high-temperature, high-pressure refrigerant discharged from compressor 10 is mostly delivered to indoor heat exchanger 20 and used for heating, and is partially delivered to first heat exchanger 40A and used for defrosting. The flow of the refrigerant is otherwise the same as that described in FIG. 4, and thus the description thereof will not be repeated.

Figure 14:
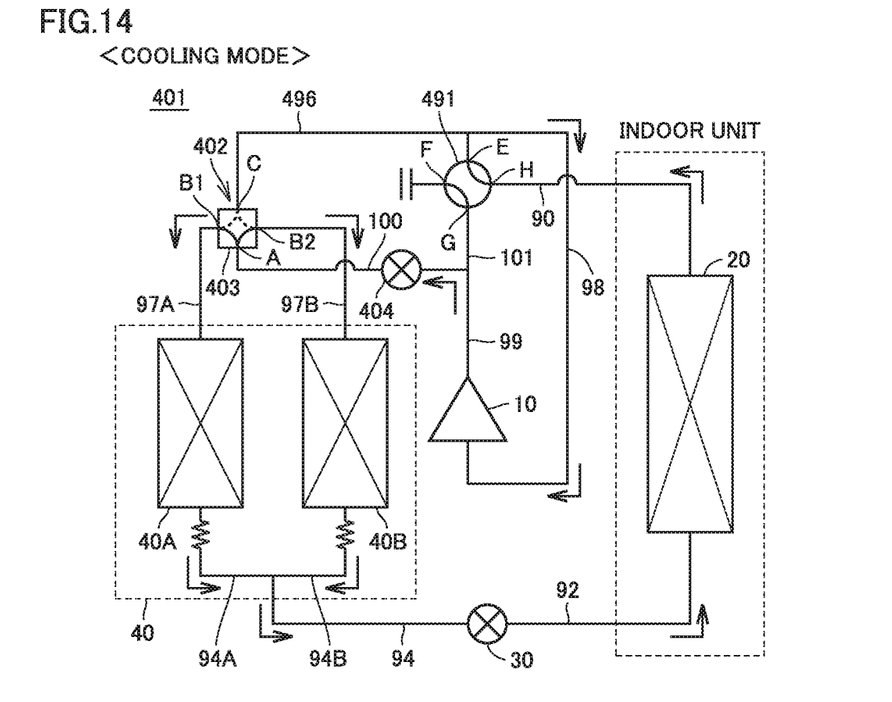
FIG. 14 is a diagram showing a state of flow path switching valve 402 and a flow of the refrigerant in a cooling mode.

FIG. 14 is a diagram showing a state of flow path switching valve 402 and a flow of the refrigerant in the cooling mode. In the cooling mode, four-way valve 491 is controlled such that port G is communicated with closed port F, and port E is communicated with port H. Flow regulating valve 404 is opened in the cooling mode. The refrigerant discharged from compressor 10 reaches expansion valve 30 through outdoor heat exchanger 40, and then returns to compressor 10 through indoor heat exchanger 20.

Figure 15:
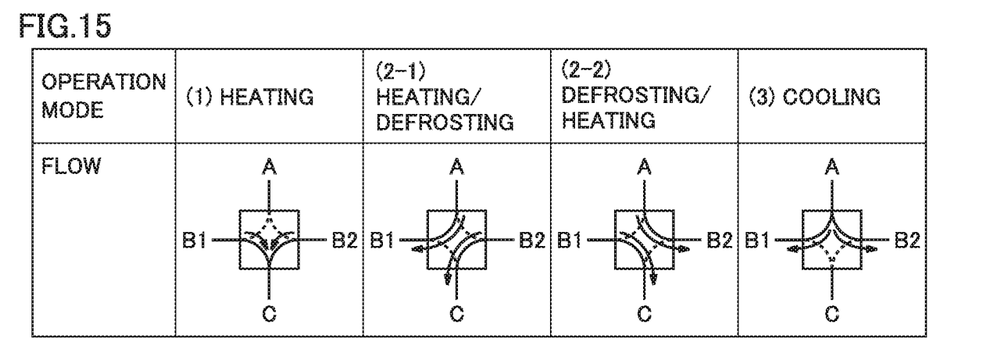
FIG. 15 is a diagram showing a flow of the refrigerant in each operation mode of flow path switching valve 402.

FIG. 15 is a diagram showing a flow of the refrigerant in each operation mode of flow path switching valve 402. The state of flow path switching valve 402 in the cooling operation mode is different from that of flow path switching valve 202 in the first embodiment. The states of flow path switching valve 402 in the other modes are the same as those of flow path switching valve 202 in the first embodiment. Referring to FIG. 15, each operation mode of flow path switching valve 402 is described.

(1) In the heating operation mode, flow path switching valve 402 is in such a state that port B1, port B2 and port C are communicated with one another while port A is cut off. The refrigerant flows from ports B1 and B2 toward port C.

(2-1) In the heating/defrosting operation mode, flow path switching valve 402 is in such a state that port A and port B1 are communicated with each other, and port B2 and port C are communicated with each other. The refrigerant flows from port A toward port B1, and, independently of this flow, flows from port B2 toward port C.

(2-2) In the defrosting/heating operation mode, flow path switching valve 402 is in such a state that port A and port B2 are communicated with each other, and port B1 and port C are communicated with each other. The refrigerant flows from port A toward port B2, and, independently of this flow, flows from port B1 toward port C.

(3) In the cooling operation mode, flow path switching valve 402 is in such a state that port A, port B1 and port B2 are communicated with one another while port C is cut off. The refrigerant flows from port A toward ports B1 and B2.

Next, a configuration example of flow path switching valve 402 is described. Flow path switching valve 402 can be realized by changing the rotary disk inside flow path switching valve 202A shown in FIG. 9.

Figure 16:
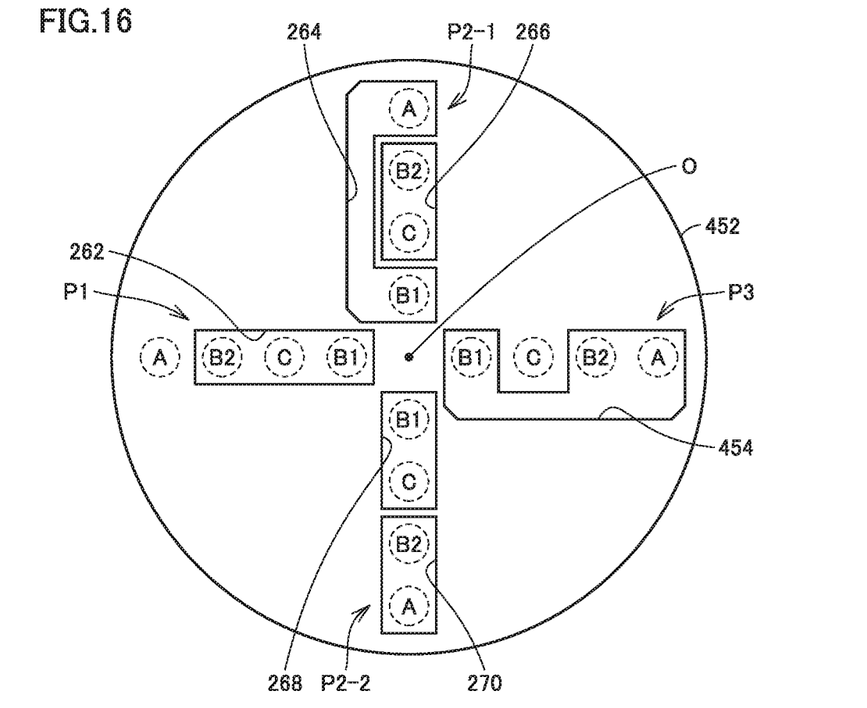
FIG. 16 is a diagram showing the shape of a rotary disk 452 of flow path switching valve 402.

FIG. 16 is a diagram showing the shape of a rotary disk 452 of flow path switching valve 402. Referring to FIG. 16, rotary disk 452 is provided with recess 454, in addition to recesses 262, 264, 266, 268 and 270, in its upper surface.

Recess 262 is provided at rotational position P1 selected in the heating mode, and forms, together with the case of valve body 250, a flow path through which ports B1, B2 and C are communicated with one another. A sealing member such as an O ring is arranged around recess 262 to attain sealing so as to prevent leakage of the refrigerant from the case of valve body 250.

Recess 264 is provided at rotational position P2-1 selected in the heating/defrosting mode (2-1). Recess 264 forms, together with the case of valve body 250, a flow path through which ports A and B1 are communicated with each other. Recess 266 is provided at rotational position P2-1 selected in the heating/defrosting mode (2-1). Recess 266 forms, together with the case of valve body 250, a flow path through which ports B2 and C are communicated with each other.

Recess 268 is provided at rotational position P2-2 selected in the defrosting/heating mode (2-2). Recess 268 forms, together with the case of valve body 250, a flow path through which ports B1 and C are communicated with each other. Recess 270 is provided at rotational position P2-2 selected in the defrosting/heating mode (2-2). Recess 270 forms, together with the case of valve body 250, a flow path through which ports B2 and A are communicated with each other.

Recess 454 is provided at rotational position P3 selected in the cooling mode. Recess 454 forms, together with the case of valve body 250, a flow path through which ports B1, B2 and A are communicated with one another.

In the rotary disk shown in FIG. 10, position P1 selected in the heating mode and position P3 selected in the cooling mode are the same position. In FIG. 16, position P1 and position P3 are different positions, and therefore, rotary disk 452 is configured such that the flow path is changed each time rotary disk 452 is rotated 90°.

While the rotational positions are equally provided at approximately every 90° in FIG. 16, it is not particularly required for the rotational positions to be equally provided. The rotational positions may be changed as appropriate as long as they are spaced such that the recesses of the flow paths do not overlap one another. In addition, while the configuration was shown having four connection ports aligned in a row, it is not required for the connection ports to be aligned in a row. For example, the connection ports may be arranged in two rows and two columns, with the recesses altered in shape in accordance with the arrangement of the connection ports. In this case, the diameter of the rotary disk can be reduced.

In addition, as in the first embodiment, the valve body may be formed into a vertically long cylindrical shape, with four connection ports linearly aligned on the side of a cylindrical case. In this case, a cylindrical member provided with four patterns of recesses of flow paths on its side may be housed in the cylindrical case. Similar flow path switching can be performed by rotating the cylindrical member around a rotation axis passing through the center of a circle of each of upper and lower bottom surfaces.

The air conditioning apparatus of the second embodiment can, in addition to the effects produced in the first embodiment, reduce the heat loss at the four-way valve during heating, thereby consuming less power.

It should be understood that the embodiments disclosed herein are illustrative and non-restrictive in every respect. The scope of the present invention is defined by the terms of the claims, rather than the embodiments described above, and is intended to include any modifications within the scope and meaning equivalent to the terms of the claims.

It should be understood that the embodiments disclosed herein are illustrative and non-restrictive in every respect. The scope of the present invention is defined by the terms of the claims, rather than the embodiments described above, and is intended to include any modifications within the scope and meaning equivalent to the terms of the claims.

The invention claimed is:

1. An air conditioning apparatus, comprising:
a refrigeration circuit in which a refrigerant circulates through a compressor, an indoor heat exchanger, an expansion valve and an outdoor heat exchanger in this order during heating operation;
a four-way valve configured to connect a refrigerant outlet of the compressor to the indoor heat exchanger during the heating operation, and to connect a refrigerant inlet of the compressor to the indoor heat exchanger during cooling operation;
a flow restriction valve configured to restrict a flow of the refrigerant from the compressor; and a single switching valve provided in a flow path between the compressor and the outdoor heat exchanger, wherein the outdoor heat exchanger including a first heat exchange unit and a second heat exchange unit having flow paths independent of each other, the single switching valve including:
- a first connection port connected to the refrigerant outlet of the compressor,
- a second connection port connected to the first heat exchange unit during the heating operation,
- a third connection port connected to the second heat exchange unit during the heating operation, and
- a fourth connection port connected to the refrigerant inlet of the compressor during the heating operation, during the heating operation, the second connection port, the third connection port and the fourth connection port being communicated with one another and not being communicated with the first connection port, during defrosting operation of the first heat exchange unit, the first connection port and the second connection port being communicated with each other, and the third connection port and the fourth connection port being communicated with each other, and during defrosting operation of the second heat exchange unit, the first connection port and the third connection port being communicated with each other, and the second connection port and the fourth connection port being communicated with each other, the flow restriction valve being provided in a flow path connecting the refrigerant outlet of the compressor to the first connection port to restrict the flow of the refrigerant from the compressor.

2. The air conditioning apparatus according to claim 1, wherein
the four-way valve is configured to connect the refrigerant outlet of the compressor to the indoor heat exchanger and connect the refrigerant inlet of the compressor to the fourth connection port during the heating operation, and to connect the refrigerant outlet of the compressor to the fourth connection port and connect the refrigerant inlet of the compressor to the indoor heat exchanger during the cooling operation, and the single switching valve is configured such that the second connection port, the third connection port and the fourth connection port are communicated with one another and are not communicated with the first connection port during the cooling operation.

3. The air conditioning apparatus according to claim 1, wherein
the flow restriction valve includes a flow regulating valve configured to be closed during the heating operation, to be opened during the cooling operation, and such that its opening is reduced during the defrosting of the first heat exchange unit or the second heat exchange unit, and the single switching valve is configured such that the first connection port, the second connection port and the third connection port are communicated with one another and are not communicated with the fourth connection port during the cooling operation.

* * * * *